US008724819B2

(12) United States Patent
Asokan et al.

(10) Patent No.: US 8,724,819 B2
(45) Date of Patent: May 13, 2014

(54) CREDENTIAL PROVISIONING (75) Inventors: Nadarajah Asokan, Espoo (FI);
Jan-Erik Ekberg, Vanda (FI); Aarne Rantala, Espoo (FI); Markku Kylänpää, Helsinki (FI)

(73) Assignee: Nokia Corporation, Espoo (FI)

( * ) Notice: Subject to any disclaimer, the term of this patent is extended or adjusted under 35 U.S.C. 154(b) by 596 days.

(21) Appl. No.: 12/738,616

(22) PCT Filed: Oct. 16, 2007

(86) PCT No.: PCT/FI2007/050555
§ 371 (c)(1),
(2), (4) Date: Jun. 1, 2010

(87) PCT Pub. No.: WO2009/050324
PCT Pub. Date: Apr. 23, 2009

(65) Prior Publication Data
US 2010/0266128 A1 Oct. 21, 2010

(51) Int. Cl.
*H04L 29/06* (2006.01)
(52) U.S. Cl.
USPC .......................................... 380/278; 713/150
(58) Field of Classification Search
USPC .......................................... 713/150; 380/278
See application file for complete search history.

(56) References Cited

U.S. PATENT DOCUMENTS 4,227,253 A * 10/1980 Ehrsam et al. .................. 380/45
5,631,961 A * 5/1997 Mills et al. .................... 380/286
5,754,761 A * 5/1998 Willsey ............................ 726/30
6,070,198 A * 5/2000 Krause et al. ................. 719/321
6,952,770 B1 * 10/2005 Mittal et al. .................. 713/168
7,095,852 B2 * 8/2006 Wack et al. ..................... 380/44
7,436,816 B2 * 10/2008 Mehta et al. .................. 370/352
7,549,062 B2 * 6/2009 Kouznetsov et al. ......... 713/193
7,571,489 B2 * 8/2009 Ong et al. ........................ 726/29
7,577,258 B2 * 8/2009 Wiseman et al. ............. 380/281
7,702,922 B2 * 4/2010 Hetzler ........................ 713/193
7,712,086 B2 * 5/2010 Hughes et al. ................ 717/131
7,765,397 B2 * 7/2010 England et al. .............. 713/155
7,817,800 B2 * 10/2010 Wack et al. ..................... 380/44

(Continued)

FOREIGN PATENT DOCUMENTS

EP          1117204 A2    7/2001
FR          2831362 A1    4/2003

(Continued)

OTHER PUBLICATIONS

Nystroem et al., "Dynamic Symmetric Key Provisioning Protocol (DSKPP)" Jun. 13, 2007.

(Continued)

*Primary Examiner* — David Garcia Cervetti
(74) *Attorney, Agent, or Firm* — Harrington & Smith (57) ABSTRACT

Disclosed is a method in a provisioning apparatus. The method comprises obtaining a family key, a family key defining a family; submitting the family key to a security element in a secure manner (2-2); using the family key for securing credential data; submitting said secured credential data to the security element (2-4); using the family key for binding an application to the family; and submitting said binding to the security element (2-5). Also a method in a related security element and related apparatuses, systems and computer programs are disclosed.

35 Claims, 5 Drawing Sheets

(56) References Cited

U.S. PATENT DOCUMENTS

| | | | | |
|---|---|---|---|---|
| 7,831,043 | B2* | 11/2010 | Lotspiech | 380/201 |
| 7,908,483 | B2* | 3/2011 | Iliev et al. | 713/176 |
| 8,064,605 | B2* | 11/2011 | Brutch et al. | 380/277 |
| 8,077,870 | B2* | 12/2011 | Wack et al. | 380/44 |
| 8,255,690 | B2* | 8/2012 | Wiseman et al. | 713/171 |
| 8,265,275 | B2* | 9/2012 | Lotspiech | 380/201 |
| 8,447,889 | B2* | 5/2013 | Jogand-Coulomb et al. | 710/8 |
| 8,447,979 | B2* | 5/2013 | Li | 713/170 |
| 8,458,480 | B2* | 6/2013 | Iliev et al. | 713/176 |
| 2002/0026575 | A1* | 2/2002 | Wheeler et al. | 713/156 |
| 2003/0037237 | A1* | 2/2003 | Abgrall et al. | 713/166 |
| 2003/0061477 | A1* | 3/2003 | Kahn et al. | 713/150 |
| 2003/0084332 | A1* | 5/2003 | Krasinski et al. | 713/200 |
| 2003/0190044 | A1* | 10/2003 | Higashi et al. | 380/201 |
| 2004/0139098 | A1* | 7/2004 | Margolus et al. | 707/100 |
| 2004/0139303 | A1* | 7/2004 | Margolus et al. | 712/220 |
| 2004/0143578 | A1* | 7/2004 | Margolus et al. | 707/10 |
| 2004/0143743 | A1* | 7/2004 | Margolus et al. | 713/176 |
| 2004/0143744 | A1* | 7/2004 | Margolus et al. | 713/176 |
| 2004/0143745 | A1* | 7/2004 | Margolus et al. | 713/176 |
| 2004/0162808 | A1* | 8/2004 | Margolus et al. | 707/1 |
| 2004/0205028 | A1* | 10/2004 | Verosub et al. | 705/59 |
| 2004/0255140 | A1* | 12/2004 | Margolus et al. | 713/193 |
| 2005/0005120 | A1* | 1/2005 | Kahn et al. | 713/171 |
| 2005/0131903 | A1* | 6/2005 | Margolus et al. | 707/10 |
| 2005/0131904 | A1* | 6/2005 | Margolus et al. | 707/10 |
| 2005/0131905 | A1* | 6/2005 | Margolus et al. | 707/10 |
| 2005/0131961 | A1* | 6/2005 | Margolus et al. | 707/200 |
| 2005/0195975 | A1* | 9/2005 | Kawakita | 380/30 |
| 2005/0278716 | A1* | 12/2005 | Koppen et al. | 717/168 |
| 2006/0013399 | A1* | 1/2006 | Brickell et al. | 380/278 |
| 2006/0013400 | A1* | 1/2006 | Sutton et al. | 380/278 |
| 2006/0013402 | A1* | 1/2006 | Sutton et al. | 380/282 |
| 2006/0101286 | A1* | 5/2006 | Catherman et al. | 713/193 |
| 2006/0130004 | A1* | 6/2006 | Hughes et al. | 717/131 |
| 2006/0137016 | A1* | 6/2006 | Margalit et al. | 726/26 |
| 2006/0161502 | A1* | 7/2006 | Cerruti et al. | 705/71 |
| 2006/0256105 | A1* | 11/2006 | Scarlata et al. | 345/418 |
| 2007/0003064 | A1* | 1/2007 | Wiseman et al. | 380/281 |
| 2007/0006169 | A1* | 1/2007 | Iliev et al. | 717/131 |
| 2007/0036456 | A1* | 2/2007 | Kahn et al. | 386/94 |
| 2007/0136465 | A1* | 6/2007 | Fernandes et al. | 709/225 |
| 2007/0220598 | A1* | 9/2007 | Salowey et al. | 726/10 |
| 2007/0250706 | A1* | 10/2007 | Oba | 713/159 |
| 2007/0265966 | A1* | 11/2007 | Kahn et al. | 705/51 |
| 2007/0265967 | A1* | 11/2007 | Kahn et al. | 705/51 |
| 2007/0265968 | A1* | 11/2007 | Kahn et al. | 705/51 |
| 2007/0265970 | A1* | 11/2007 | Kahn et al. | 705/52 |
| 2007/0265973 | A1* | 11/2007 | Kahn | 705/57 |
| 2007/0265978 | A1* | 11/2007 | Kahn et al. | 705/59 |
| 2007/0266414 | A1* | 11/2007 | Kahn et al. | 725/113 |
| 2008/0028235 | A1* | 1/2008 | Smith et al. | 713/190 |
| 2008/0031445 | A1* | 2/2008 | Lee et al. | 380/44 |
| 2008/0148062 | A1* | 6/2008 | Ekberg et al. | 713/187 |
| 2008/0222292 | A1* | 9/2008 | Fernandes et al. | 709/226 |
| 2008/0249946 | A1* | 10/2008 | Candelore | 705/59 |
| 2008/0260351 | A1* | 10/2008 | Li et al. | 386/94 |
| 2008/0279386 | A1* | 11/2008 | Kahn et al. | 380/278 |
| 2009/0092253 | A1* | 4/2009 | Asipov et al. | 380/278 |
| 2009/0177887 | A1* | 7/2009 | Li | 713/170 |
| 2010/0037068 | A1* | 2/2010 | Murase et al. | 713/193 |
| 2010/0104103 | A1* | 4/2010 | Guo et al. | 380/278 |
| 2010/0114782 | A1* | 5/2010 | Candelore | 705/57 |
| 2010/0150351 | A1* | 6/2010 | Sutton et al. | 380/277 |
| 2010/0180291 | A1* | 7/2010 | Kahn et al. | 725/31 |
| 2010/0185855 | A1* | 7/2010 | Margolus et al. | 713/165 |
| 2010/0266128 | A1* | 10/2010 | Asokan et al. | 380/278 |
| 2011/0058669 | A1* | 3/2011 | Kumar et al. | 380/210 |
| 2011/0119502 | A1* | 5/2011 | England et al. | 713/189 |
| 2011/0247079 | A1* | 10/2011 | Candelore | 726/27 |
| 2011/0271306 | A1* | 11/2011 | Kahn et al. | 725/68 |
| 2011/0276490 | A1* | 11/2011 | Wang et al. | 705/50 |
| 2012/0105519 | A1* | 5/2012 | Urlaub et al. | 347/5 |

FOREIGN PATENT DOCUMENTS

| | | |
|---|---|---|
| WO | WO-2005/086593 A2 | 9/2005 |
| WO | 2007062672 A1 | 6/2007 |
| WO | 2007062689 A1 | 6/2007 |

OTHER PUBLICATIONS

International Search Report and Written Opinion of the International Searching Authority received in PCT Application No. PCT/FI2007/050555, dated Jun. 5, 2008, 15 pages.

"Global Platform, Card Specification, Version 2.2"; Mar. 1, 2006; whole document (375 pages; Sections 9, 11, Annexes C-F); Global Platform.

Sharma, A.K.; "Onboard Credentials: Hardware Assisted Secure Storage of Credentials"; Jan. 17, 2007; whole document (78 pages; Section 4); Retrieved from the Internet on May 5, 2009, URL: http://asokan.org/asokan/researchAish-Thesis-final.pdf.

"TCG Specification Architecture Overview, Specification Revision 1.4"; Aug. 2, 2007; whole document (54 pages; Section 4); Retrieved from the Internet on May 5, 2009, URL: http://www.trustedcomputinggroup.org/files/resource_files/ac652de1-1d09-3519-ada026a0c05cfac2/tcg_1_4_architecture_overview.pdf.

* cited by examiner

CREDENTIAL PROVISIONING

RELATED APPLICATION

This application was originally filed as PCT Application No. PCT/FI2007/050555 filed on Oct. 16, 2007 and incorporated herein by reference in its entirety.

FIELD OF THE INVENTION

The present invention generally relates to authentication and to provisioning credentials used for authentication.

BACKGROUND OF THE INVENTION

Authentication and access control for services is usually based on proving knowledge of some sort of secret credential. Often such credentials are stored and used within a security element such as a smartcard or a device containing a secure environment (like a mobile phone with ARM TrustZone). Some security elements, like SIM (subscriber identification module) cards of mobile phones, are used for a single purpose and have fixed credentials.

There are also "blank" security elements to which credentials can be securely provisioned when needed. For example, IETF (internet engineering task force) keyprov working group is working on mechanisms to provision symmetric key credentials for security elements. DSKPP (dynamic symmetric key provisioning protocol) draft (draft-doherty-keyprov-dskpp-01.txt) discloses mechanisms for provisioning keys to a specific security element by using a public key specific to that security element.

Additionally there are general purpose security elements, which can be used to store and use different types of credentials. For example, multi-application smartcards can simultaneously contain different smartcard applications, each operating on different credentials. Secrets can be provisioned to such an application residing on a multi-application smartcard based on a symmetric key shared between the application and the provisioner of the secret. A limitation of such systems is that only those applications approved and authorized by the issuer of the smartcard can be installed and used on the smartcard. Another limitation of such provisioning is that it concerns only provisioners who have an existing security association with the security element (i.e. manufacturer of the security element or someone authorized by the manufacturer.

Thus there is room for further considerations.

SUMMARY

According to a first aspect of the invention there is provided a method in a provisioning apparatus, the method comprising:
obtaining a family key, a family key defining a family;
submitting the family key to a security element in a secured manner;
using the family key for securing credential data;
submitting said secured credential data to the security element;
using the family key for binding an application to the family; and
submitting said binding to the security element.

In an embodiment the method further comprises using public key cryptography for securing the family key. In another embodiment the method further comprises using a secure submission channel for securing the family key.

In an embodiment the method further comprises:
securing an application,
submitting said secured application to the security element; and
using said family key for binding said application to said family.

In an embodiment, the application is secured with a public key associated with the security element. In another embodiment, the application is secured with the family key.

In an embodiment the method further comprises:
submitting said secured credential data to the security element with an associated family identification information, and
submitting said binding to the security element with an associated family identification information.

In an embodiment, obtaining the family key comprises obtaining a previously used family key. In another embodiment, obtaining the family key comprises generating a new family key.

In an embodiment the family key is a symmetric key.

In an embodiment the method further comprises:
using the family key for securing plurality of credential data; and
submitting said plurality secured credential data to the security element.

In an embodiment the method further comprises:
using the family key for binding a plurality of applications to the family; and
submitting said plurality of bindings to the security element.

According to a second aspect of the invention there is provided a method in a security element, the method comprising:
receiving a family key transmitted in a secured manner, the family key defining a family;
receiving credential data secured with the family key;
receiving information binding at least one application to the family; and
limiting access to said credential data for applications not having a binding to said family.

In an embodiment relating to the second aspect, the family key is secured with public key cryptography. In another embodiment relating to the second aspect, the family key is secured by using a secure submission channel for transmitting the family key.

In an embodiment the method of the second aspect further comprises:
receiving in secured form said at least one application bind to the family.

In an embodiment relating to the second aspect, the application is secured with a public key associated with the security element. In another embodiment relating to the second aspect, the application is secured with the family key.

In an embodiment the method of the second aspect further comprises:
receiving said secured credential data with an associated family identification information,
receiving said binding information with an associated family identification information, and
using said family identification information for checking, whether a given application and given credentials have a binding to the same family.

In an embodiment relating to the second aspect the family key is a symmetric key.

In an embodiment the method of the second aspect further comprises:

receiving a plurality credential data secured with said family key.

In an embodiment the method of the second aspect further comprises:

receiving information binding a plurality of applications to said family.

According to a third aspect of the invention there is provided a provisioning apparatus comprising:

a memory, a processing unit coupled to the memory, wherein the processing unit is configured to obtain a family key, a family key defining a family;

submit the family key to a security element in a secured manner;

use the family key for securing credential data;

submit said secured credential data to the security element;

use the family key for binding an application to the family; and submit said binding to the security element.

According to a fourth aspect of the invention there is provided a security element comprising:

a memory, a processing unit coupled to the memory, wherein the processing unit is configured to receive a family key transmitted in a secured manner, the family key defining a family;

receive credential data secured with the family key;

receive information binding at least one application to the family; and limit access to said credential data for applications not having a binding to said family.

The security element may be for example an independent physical element, or a dedicated computational hardware unit of an end user device, or a security functionality of a processing unit of an end user device.

According to a fifth aspect of the invention there is provided a memory medium embodying a computer program adapted to control an apparatus to perform the method of the first aspect or any applicable embodiment.

According to a sixth aspect of the invention there is provided a memory medium embodying a computer program adapted to control an apparatus to perform the method of the second aspect or any applicable embodiment.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

In the following, some example implementations of the invention are discussed.

In an embodiment a security element (SE) has an asymmetric keypair, i.e. there is a public key and a private key. The private key is kept secret and the public key may be distributed to anyone. The keys are related mathematically, but the private key cannot be practically derived from the public key. A message encrypted with the public key can be decrypted only with the corresponding private key.

The asymmetric keypair may have been initialized during manufacture. In an embodiment provisioners of credentials have some means allowing them to verify, whether a certain public key belongs to a specific security element. Thereby the provisioners know that the associated private key is within the specific security element. This verifying may be done for example by means of using public device certificates issued by the manufacturer of the security element and made freely available, e.g., via a directory service.

In an embodiment of the invention a family key is provisioned to a security element. The provisioning of the family key may be secured (e.g. encrypted) for example by means of the public key mentioned above. Another alternative that may be used is that the family key is transmitted in the clear through a secured channel, e.g. a physical provisioning channel. Also some other alternative of provisioning the family key may be suitable for use in connection with various embodiments of the invention.

The family key is then used to protect provisioning of credential data to the security element and to authorize a given credential application (script) as a member of the family. The applications authorized as members of the family are then allowed to access the credential data protected by the family key.

Figure 1:
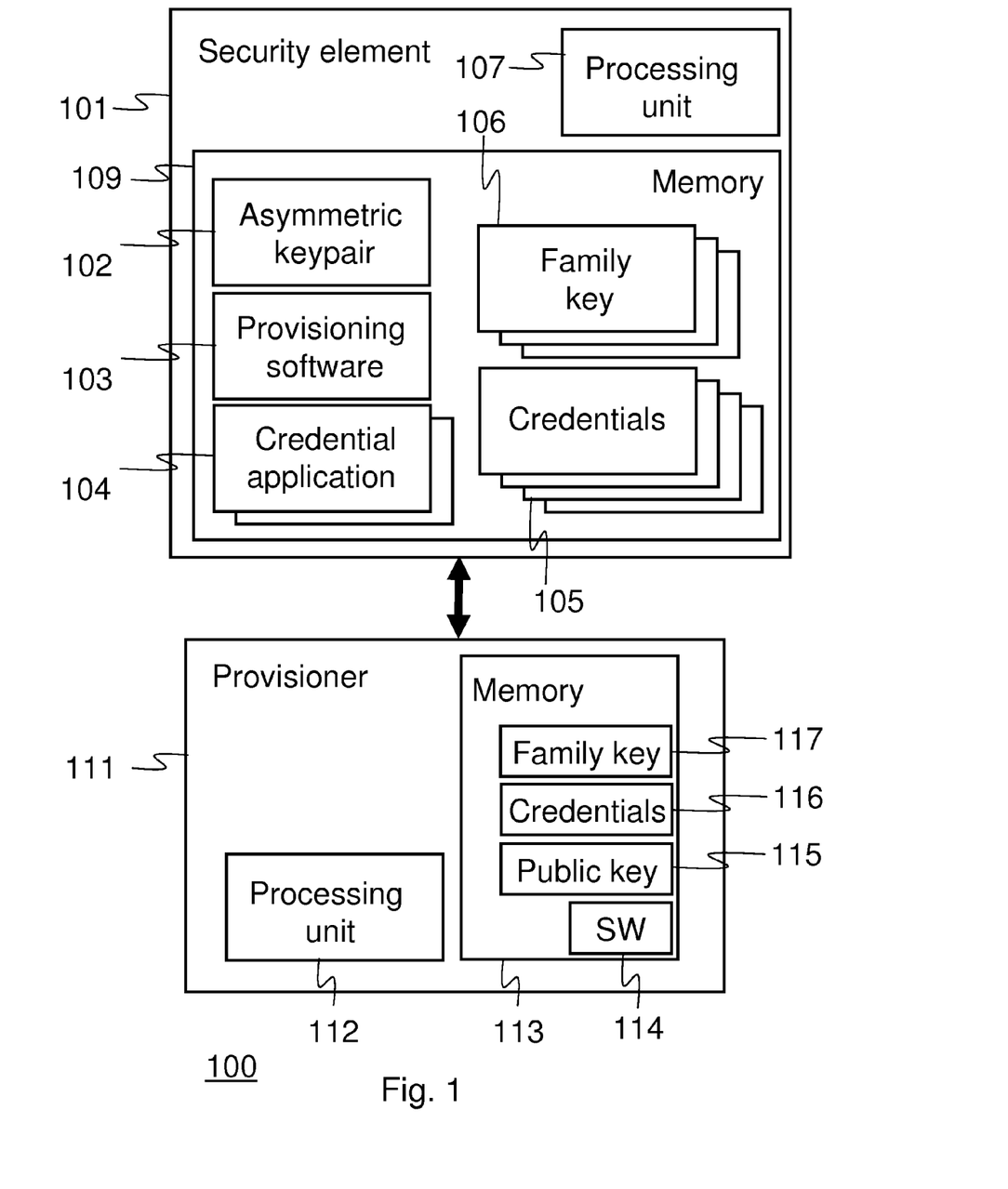
FIG. 1 shows a system according to an embodiment of the invention.

Turning now to FIG. 1, a system 100 according to an embodiment of the invention is discussed. The system comprises a security element 101 and a provisioner device 111. The security element may reside inside some type of end user device, but for sake of clarity such device is not shown in the figure. The security element may be an independent detachable element (such as a SIM card), or a dedicated computational hardware unit on the end user device, or a security functionality of a processing unit of the end user device. The provisioner device and the security element are enabled to communicate with each other at least so that the provisioner device may submit data to the security element.

The security element 101 comprises a memory 109 storing an asymmetric keypair 102, i.e. a public key and a private key. The private key is held in secret within the security element and the public key is distributed to other devices (e.g. to the provisioner device 111). Further the memory comprises one or more credentials 105, one or more credential applications 104, and one or more family keys 106 submitted by one or more credential provisioners. It is however not mandatory that the credential applications reside in the security element. Instead they may reside outside the security element and just use the credentials stored in the security element. In an embodiment the credential applications are stored outside the security element and read into and temporarily saved into the security element during execution. In yet another embodiment even the credentials are stored outside the security element after properly securing them (e.g. by encrypting and/or integrity-protecting them using a key that is permanently held inside the security element). That is, it is possible that both the credentials and the credential applications are only temporarily read into the security element whenever they are needed.

A provisioning software 103 provides instructions for controlling operations related to receiving and using provisioned credentials. Additionally the security element comprises some type of processing unit 107 enabling execution of various operations.

The provisioner device 111 comprises a processing unit 112 for controlling the device and a memory 113 including a computer program code or software 114. The processing unit 112 may be a central processing unit (CPU) or a master control unit MCU. Alternatively, the processor may be a microprocessor, a digital signal processor, an application specific integrated circuit, a field programmable gate array, a microcontroller or a combination of such elements. The software 114 includes instructions for the processing unit 112 to control the device 111 such as an operating system and different computer applications. The software 114 may comprise instructions for controlling the apparatus to provide some functionality of the invention.

Further a public key 115 of a security element (e.g. security element 101) may be stored in the memory 112. The public key may have been obtained from a public directory or a www-service, for example. It is possible that the public key is only temporarily stored in the memory 112, i.e. the public key may be read in e.g. from the security element whenever it is needed and it is not mandatory to have the public key permanently stored in the provisioner device. Also credentials 116 and a family key 117, which may have been generated by the processing unit according to instructions of the software 113, are at least temporarily stored in the memory 112. The device may be configured to submit the credentials 116 to a security element by means of the public key and the family key.

Additionally the provisioner device 111 may further comprise a network interface unit or a communication unit (not shown) for enabling communication with other devices. The device could also comprise a user interface unit (not shown), such as a display and a keyboard.

Figure 2A:
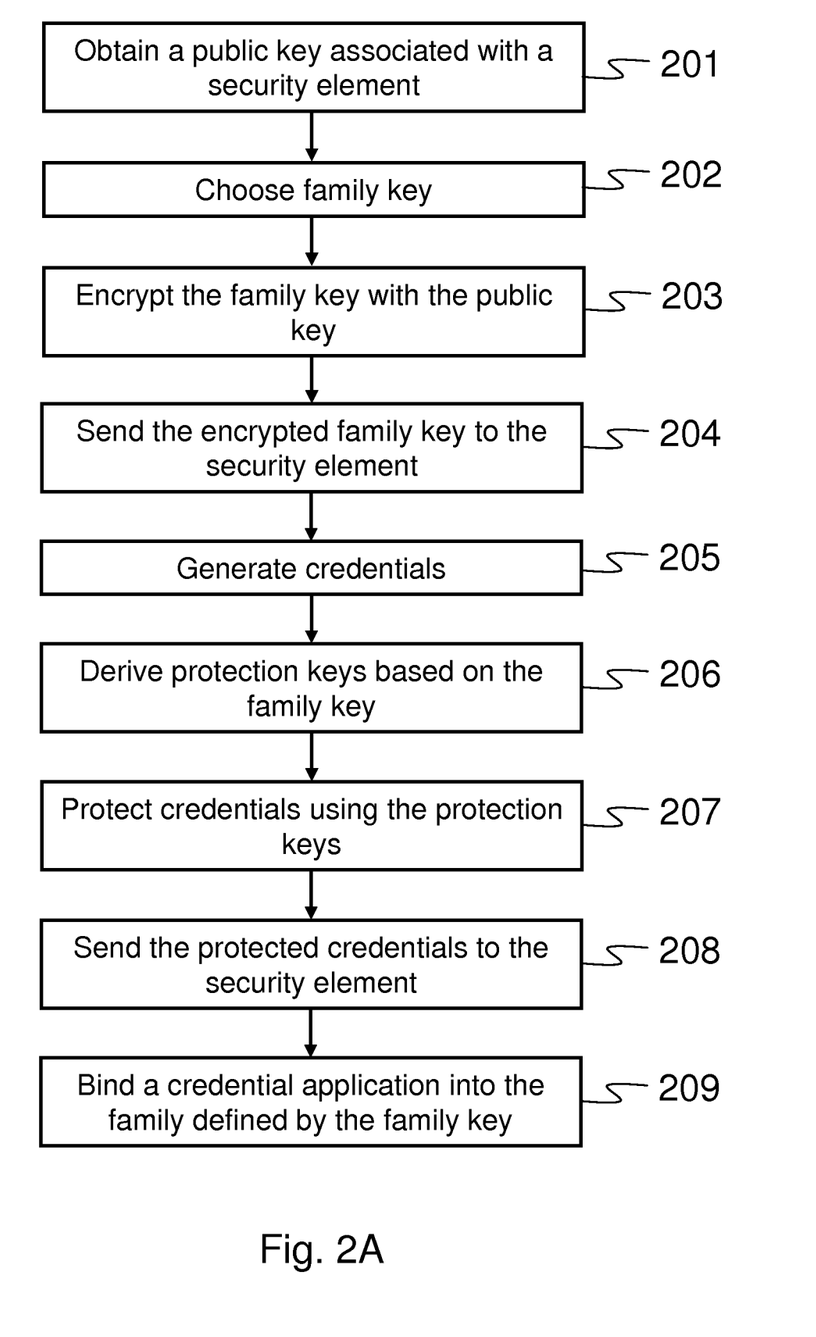
FIG. 2A is a flow diagram illustrating a method in accordance with an embodiment.

FIG. 2A is a flow diagram illustrating operation of a provisioner device in accordance with an embodiment. The method proceeds as follows:

A credential provisioner obtains a public key associated with a certain security element, phase 201.

A family key is chosen by the credential provisioner, phase 202. The family key may be a symmetric key. Basically a symmetric key is such that it can be used both for encryption and decryption. It is however possible that there is a simple transform to go between the encryption and decryption keys. The relation between the keys is anyway trivial. Thereby the use of a symmetric key is based on having a shared secret (the key) between parties that want to secure information. I.e. the symmetric key is to be distributed only to parties that are allowed to have access to the information secured with the key. As appropriate, the provisioner may generate a new family key or use an existing one.

The family key is encrypted using the public key associated with the certain security element, phase 203.

The family key is sent to the security element, e.g. in a "family base PDU" data packet (PDU, protocol data unit), phase 204.

Desired credentials are generated or chosen, phase 205.

Credential protection keys (e.g. confidentiality key and integrity key) are derived from the family key, phase 206.

Credentials are protected (e.g. encrypted) with the confidentiality key, phase 207.

Protected credentials are sent to the security element, e.g. in a "data provisioning PDU", phase 208.

A credential application is added to the family defined by the family key, phase 209. A credential application (script) may be added to the family by issuing a "script identity PDU" which cryptographically binds the credential application to the family key. A script identity PDU essentially authorizes an application to gain access to data (credentials) provisioned using a given family key.

One should note that the method flow discussed above is just one example and that also other options are feasible. For example, the order of steps 204-209 may vary from the shown order in any suitable manner. That is, one may first bind one or more applications to a family and only then provide credentials for use by the application(s) or vice versa. One might also first bind one application to the family and then provide credentials and later bind more applications to the family. Further one may later provide more credentials to a family at any suitable time.

For example a provisioning software on the security element may be responsible for extracting the family key and the provisioned credentials from the provisioning messages (e.g. family base PDU, data provisioning PDU, and script identity PDU mentioned above), and for checking whether a given credential application (script) is authorized by a family key to access a given credential.

In an embodiment a more fine-grained checking may be added. For example, a "family version number" (or some other family identification information) may be associated with the credentials (in the data provisioning PDU) and the scripts/credential applications (in the script identity PDU). The access control check in the security element may then consist of verifying whether the family-version associated with a given credential application has the correct relationship to the family-version associated with a credential secret it wants to access.

Figure 2B:
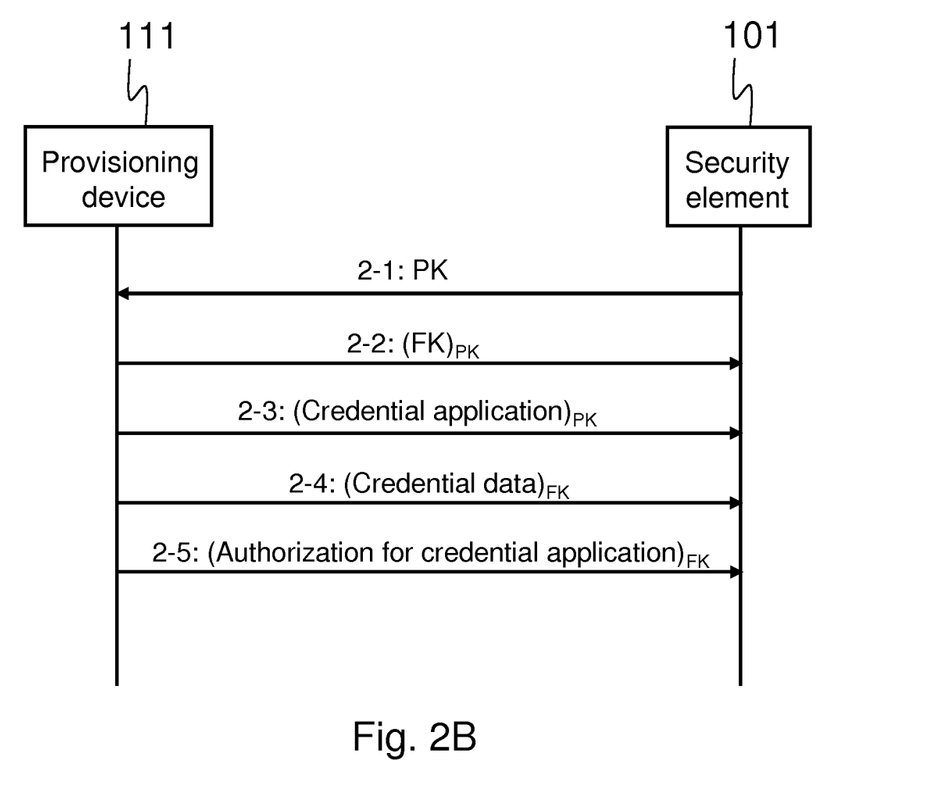
FIG. 2B is a messaging diagram illustrating a method in accordance with an embodiment.

FIG. 2B shows a messaging diagram further illustrating the messages that are exchanged between a provisioner device 111 and a security element 101 in an embodiment. The security element provides its public key (PK) 2-1 to the provisioner device. This does not need to be directly from the security element to the provisioner device. Instead some distributed service may be used for this purpose. Obtaining a public key of a given security element is further discussed in connection with FIGS. 4A and 4B.

The provisioner device then sends to the security element a message 2-2 comprising a family key (FK) secured (e.g. encrypted) with the PK, a message 2-4 comprising credential data secured (e.g. encrypted) with the FK, and a message 2-5 comprising an authorization for a given credential application secured with the FK. The figure shows also an optional message 2-3 comprising a credential application secured with the public key of the security element. In that case the credential application may be stored (in the security element or outside in a device hosting the security element) in encrypted form and decrypted by the security element before execution. Alternatively the credential application might be encrypted with the family key, as well.

Figure 3A:
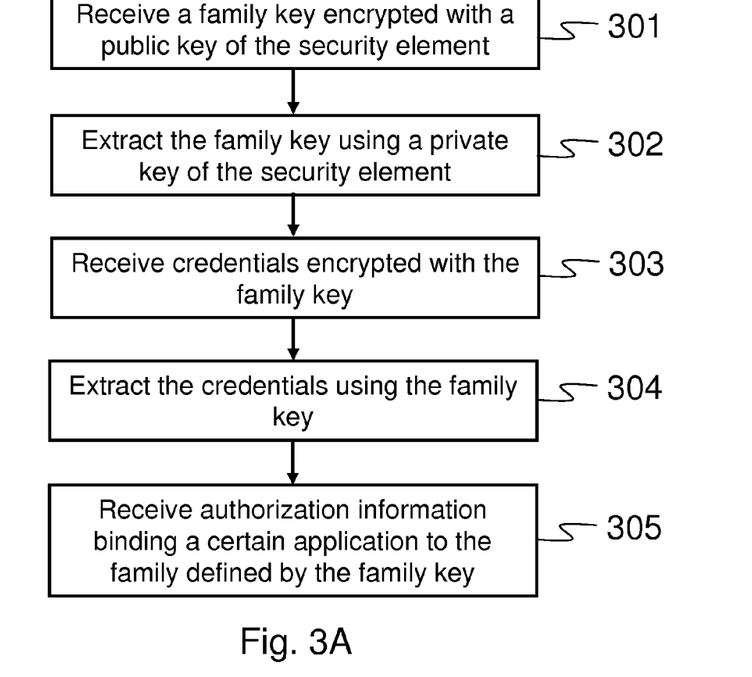
FIGS. 3A-3B are flow diagrams illustrating certain methods in accordance with some other embodiments.
Figure 3B:
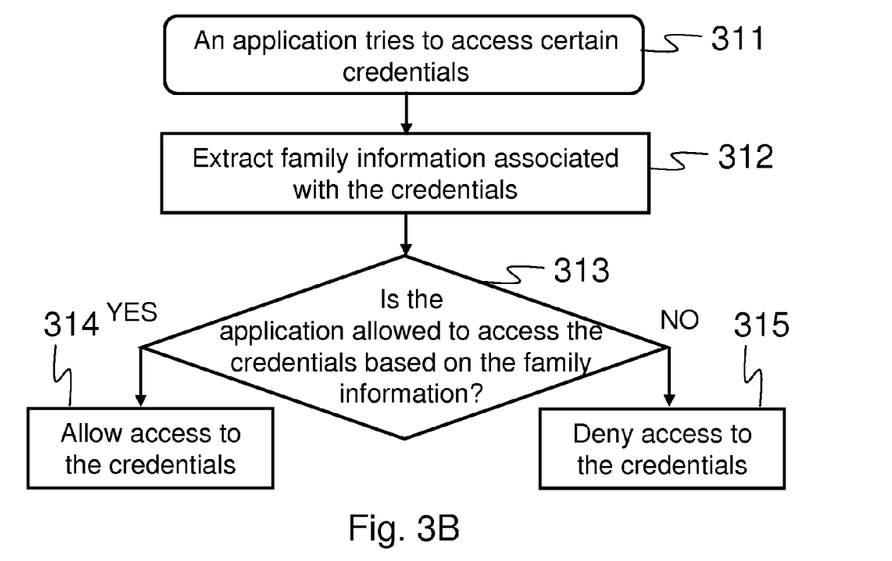

FIGS. 3A and 3B show flow diagrams illustrating operation of a security element in accordance with an embodiment. The methods may be conducted for example by the provisioning software mentioned above. The method of FIG. 3A proceeds as follows:

The security element receives a family key encrypted with the public key of the security element, phase 301. The family key may be received e.g. in a family base PDU.

The family key is extracted using a private key of the security element, phase 302.

The security element receives credentials encrypted with the family key, phase 303. The credentials may be received e.g. in a data provisioning PDU.

The credentials are extracted using the extracted family key, phase 304.

The security element receives authorization information that binds an application to a family defined by the family key, phase 305. The authorization information may be received e.g. in a script identity PDU.

In the method of FIG. 3B, an application (credential application/script) tries to access certain credentials, phase 311. The security element extracts family information associated with the credentials, phase 312. Equally, the security element may extract family information associated with the application. Then the security element checks on the basis of the extracted family information, whether the application is authorized to access the credentials, phase 313. If the credentials and the application "belong" to the same family, the application is allowed to access the credentials, phase 314. On the other hand, if the credentials and the application do not belong to the same family, access to the credentials is denied, phase 315.

Like mentioned above, in an embodiment a "family version number" (or some other family identification information) may be associated with the credentials (in the data provisioning PDU) and the scripts/credential applications (in the script identity PDU). The access control check (phase 313) in the security element may then consist of verifying whether the family-version associated with the credential application has the correct relationship to the family-version associated with the credentials it wants to access.

It must be noted that in the above discussed methods the order of the phases is not limiting. Instead, the order of the phases may be varied as appropriate. Furthermore all of the phases do not necessarily need to be executed in all implementations and some phases may be repeated plurality of times. For example, once a family key has been submitted/received, a plurality of credentials associated with that family key may be submitted/received. Also more than one credential application may be bind into one family.

Figure 4A:
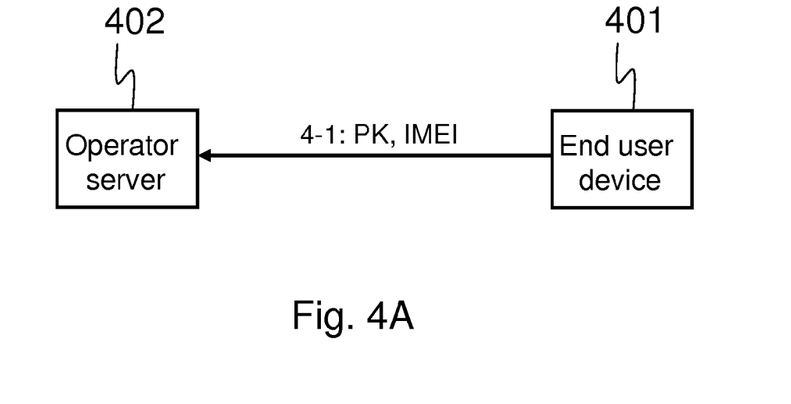
FIGS. 4A-4B show arrangements according to certain embodiments.
Figure 4B:
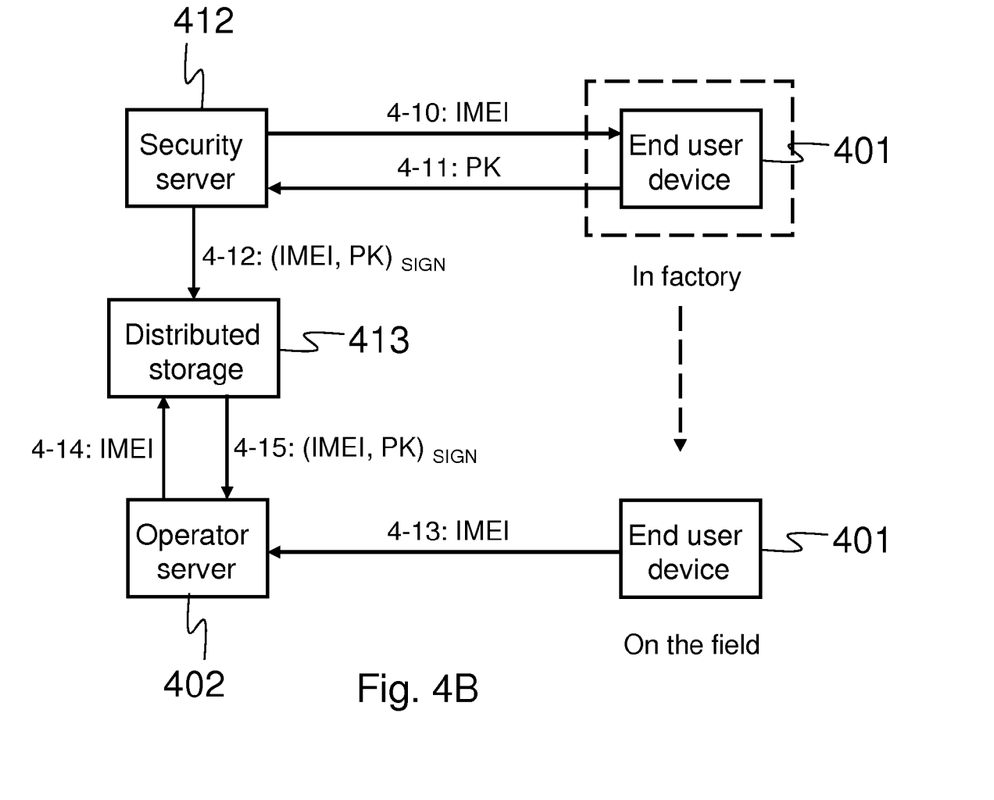

FIGS. 4A and 4B show arrangements according to certain embodiments. The arrangements concern obtaining a public key of a certain security element. The arrangements comprise an end user device 401 and an operator server 402. The end user device comprises a security element. The end user device may be for example a mobile phone and the security element may be for example a dedicated computational hardware unit on the device, a security functionality of a processing core or a SIM card. The operator server is intended to be used for provisioning credentials to end user devices. In both arrangements the operator server ends up with a public key and an identifier, such as a device serial number, e.g. the IMEI (International Mobile Equipment Identity) value, or any other parameter associated with the end user device.

In the arrangement of FIG. 4A, the end user device 401 provides a public key (PK) and IMEI 4-1, associated with the end user device directly to the operator server 402. In this case there is no confirmation of the origin/authenticity of the public key. For this reason, it may be beneficial to extract the key either during manufacturing or from a "fresh" phone (a phone that has not been handed over to an end user) to prevent man-in-the-middle (malware) attacks.

In the arrangement of FIG. 4B, a distributed storage 413, such as a www service, is used for distributing public keys of end user devices. During manufacturing in the factory an IMEI 4-10 is provided to the end user device 401 from a security server 412. The end user device 401 returns its public key 4-11 to the security server 412. The security server distributes the IMEI and the associated public key signed with a device manufacturer signing key 4-13 to the distributed storage 413. The device manufacturer signing key is some suitable secret key belonging to the manufacturer of the device 401. The operator server 402 desiring to obtain public key associated with the end user device 401 then requests IMEI of the end user device. The end user device provides its IMEI 4-13. The operator server uses the IMEI 4-14 as a database key with which a public key is requested from the distributed storage 413. The distributed storage then returns the IMEI and the associated public key signed with the device manufacturer signing key 4-15 to the operator server. The operator server may for example use a previously configured signature verification key of the device manufacturer to validate the device manufacturer's signature binding the IMEI to the device public key. The signing key and signature verification key are typically from an asymmetric digital signature scheme (like RSA).

The public key of the security element that is used in various embodiments may be for example an ElGamal public key or an RSA public key.

It must be noted that it is possible to define individual family key for each security element that is handled or a common family key may be used for all security elements to which one provisions credentials. Also some grouping of key batches may be deployed.

As it is the provisioner who establishes a family by choosing a family key and may then start to provision credentials and to bind credential applications to that family, any provisioner is allowed to provision credentials. In this way it may be possible to build such an open system for credential provisioning to general purpose security elements, which allows any provisioner to provision credentials to any specific credential application on a specific security element. Thus one may obtain finer granularity than defined in DSKPP, for example.

In various embodiments, provisioning a credential does not need to mandate any prior agreement or approval from a third party (e.g. the manufacturer of the security element or the developer of the credential application). Additionally the provisioner may be able to specify that multiple different credential applications (e.g. different versions of the same credential application or event different credential applications) are allowed to have access to the same credentials. Furthermore multiple independent provisioners may provision different credentials to one credential application. That is, one credential application may be bind to more than one family.

In the following some further details of an embodiment are discussed. In the embodiment other keys are derived from the family key (or a root provisioning key) Kp. HMAC (keyed-hash message authentication code) algorithm with SHA-1 (secure hash algorithm) as the fundamental hash algorithm is used. The keys are derived as follows:

1. A confidentiality key Kc is derived from Kp by Kp=HMAC$_{Kp}$ ("confident"). This key may be used for protecting confidentiality of data transmitted from a provisioner device to a security element.
2. An integrity key Ki is derived from Kp by Ki=HMAC$_{Kp}$ ("integrity"). This key may be used for protecting integrity of messages transmitted from a provisioner device to a security element.
3. An authentication key Ka is derived from Kp by Ka=HMAC$_{Kp}$ ("authentic"). This key may be used for providing source authentication for migration commands.

4. A code confidentiality key Kcc is derived from Kp by Kcc=$\text{HMAC}_{Kp}$ ("secretcode"). This key may be used for providing confidentiality of a credential application or script.
5. A proof-of-execution key Kpe is derived from Kp by Kpe=$\text{HMAC}_{Kp}$ ("execproof"). This key may be used for providing that a credential application or script was executed in the environment defined by the public key in question.
6. A hash diversifier value Hd is derived from Kp by Hd=$\text{HMAC}_{Kp}$ ("hashdiv"). This value may be used to diversify a plaintext hash of a credential application or script to protect against attacks when code confidentiality is deployed. One should note that a plaintext or commonly known credential application or script can be endorsed by any family key (i.e. such credential application can be made a member of any family).

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. A method performed by a provisioning apparatus comprising a processing unit and a memory, the method comprising:
choosing a family key, a family key defining a family of applications;
submitting the family key to a security element in a secured manner;
choosing credentials;
deriving protection keys based on the family key;
protecting the credentials using the protection keys for securing credential data;
submitting said secured credential data to the security element;
using the family key for binding a credential application to the family; and
submitting said binding to the security element.

2. The method of claim 1, further comprising:
using public key cryptography for securing the family key; or
using a secure submission channel for securing the family key.

3. The method of claim 2, wherein the application is secured with a public key associated with the security element or with said family key.

4. The method of claim 1, further comprising:
securing an application,
submitting said secured application to the security element; and
using said family key for binding said application to said family.

5. The method of claim 1, further comprising:
submitting said secured credential data to the security element with an associated family identification information, and
submitting said binding to the security element with associated family identification information.

6. The method of claim 1, wherein choosing the family key comprises:
choosing a previously used family key, or
generating a Previously Presented family key.

7. The method of claim 1, wherein the family key is a symmetric key.

8. The method of claim 1, further comprising:
using the family key for securing a plurality of credential data; and
submitting said plurality of secured credential data to the security element.

9. The method of claim 1, further comprising:
using the family key for binding a plurality of applications to the family; and
submitting said plurality of bindings to the security element.

10. A method performed by a security element comprising a processing unit and a memory, the method comprising:
receiving a family key transmitted in a secured manner, the family key defining a family of applications;
receiving credential data secured with protection keys derived based on the family key;
receiving information binding at least one credential application to the family; and
limiting access to said credential data for applications not having a binding to said family.

11. The method of claim 10, wherein the family key is secured with public key cryptography; or the family key is secured by using a secure submission channel for transmitting the family key.

12. The method of claim 10, further comprising:
receiving in secured form said at least one application binding to the family.

13. The method of claim 12, wherein the application is secured with a public key associated with the security element or with said family key.

14. The method of claim 10, further comprising:
receiving said secured credential data with an associated family identification information,
receiving said binding information with an associated family identification information, and
using said family identification information for checking, whether a given application and given credentials have a binding to the same family.

15. The method of claim 10, wherein the family key is a symmetric key.

16. The method of claims 10, further comprising:
receiving a plurality credential data secured with said family key.

17. The method of claim 10, further comprising:
receiving information binding a plurality of applications to said family.

18. A provisioning apparatus comprising:
a memory,
a processing unit coupled to the memory, wherein the processing unit with the memory is configured to cause the provisioning apparatus at least to:
choose a family key, a family key defining a family of applications;
submit the family key to a security element in a secured manner;
choose credentials;
derive protection keys based on the family key;
protect the credentials using the protection keys for securing credential data;
submit said secured credential data to the security element;
use the family key for binding a credential application to the family; and
submit said binding to the security element.

19. The provisioning apparatus of claim 18, wherein the processing unit is configured to:
use public key cryptography for securing the family key; or
use a secure submission channel for securing the family key.

20. The provisioning apparatus of claim 18, wherein the processing unit is configured to:
secure an application,
submit said secured application to the security element; and
use said family key for binding said application to said family.

21. The provisioning apparatus of claim 20, wherein the processing unit is configured to secure the application with a public key associated with the security element or with said family key.

22. The provisioning apparatus of claim 18, wherein the processing unit is configured to:
submit said secured credential data to the security element with an associated family identification information, and
submit said binding to the security element with an associated family identification information.

23. The provisioning apparatus of claim 18, wherein the processing unit is configured to choose the family key by:
choosing a previously used family key, or
generating a Previously Presented family key.

24. The provisioning apparatus of claim 18, wherein the family key is a symmetric key.

25. The provisioning apparatus of claim 18, wherein the processing unit is configured to:
use the family key for securing a plurality of credential data; and
submit said plurality of secured credential data to the security element.

26. The provisioning apparatus of claim 18, wherein the processing unit is configured to:
use the family key for binding a plurality of applications to the family; and
submit said plurality of bindings to the security element.

27. A security element comprising:
a memory,
a processing unit coupled to the memory, wherein the processing unit with the memory is configured to cause the security element at least to:
receive a family key transmitted in a secured manner, the family key defining a family of applications;
receive credential data secured with protection keys derived based on the family key;
receive information binding at least one credential application to the family; and
limit access to said credential data for applications not having a binding to said family.

28. The security element of claim 27, wherein the family key is secured with public key cryptography; or the family key is secured by using a secure submission channel for transmitting the family key.

29. The security element of claim 27, wherein the processing unit is configured to:
receive in secured form said at least one application binding to the family.

30. The security element of claim 29, wherein the application is secured with a public key associated with the security element or with said family key.

31. The security element of claim 27, wherein the processing unit is configured to:
receive said secured credential data with an associated family identification information,
receive said binding information with an associated family identification information, and
use said family identification information for checking, whether a given application and given credentials have a binding to the same family.

32. The security element of claim 27, wherein the family key is a symmetric key.

33. The security element of claim 27, wherein the processing unit is configured to:
receive a plurality credential data secured with said family key.

34. The security element of claim 27, wherein the processing unit is configured to:
receive information binding a plurality of applications to said family.

35. The security element of claim 27, wherein the security element is an independent physical element, or a dedicated computational hardware unit of an end user device, or a security functionality of a processing unit of an end user device.

* * * * *